(12) United States Patent
Suzuki et al.

(10) Patent No.: US 6,877,110 B2
(45) Date of Patent: Apr. 5, 2005

(54) DISK ARRAY SYSTEM

(75) Inventors: Katsuyoshi Suzuki, Odawara (JP);
Kenichi Takamoto, Odawara (JP);
Kenji Muraoka, Odawara (JP);
Hidehiko Iwasaki, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 550 days.

(21) Appl. No.: 09/790,015

(22) Filed: Feb. 20, 2001

(65) Prior Publication Data

US 2001/0049800 A1 Dec. 6, 2001

(30) Foreign Application Priority Data

May 25, 2000 (JP) ........................................ 2000-159552

(51) Int. Cl.[7] .............................................. G06F 12/12
(52) U.S. Cl. ................... 714/7; 714/6; 711/114
(58) Field of Search .......................... 714/6, 7; 711/114

(56) References Cited

U.S. PATENT DOCUMENTS

| | | | |
|---|---|---|---|
| 4,870,643 A | | 9/1989 | Bultman et al. |
| 5,721,861 A | | 2/1998 | Ohizumi |
| 5,822,782 A | * | 10/1998 | Humlicek et al. ........... 711/170 |
| 6,243,790 B1 | * | 6/2001 | Yorimitsu .................... 711/112 |
| 6,363,457 B1 | * | 3/2002 | Sundberg .................... 711/114 |
| 6,567,889 B1 | * | 5/2003 | DeKoning et al. ........... 711/114 |
| 6,618,821 B1 | * | 9/2003 | Duncan et al. ................ 714/14 |
| 6,671,776 B1 | * | 12/2003 | DeKoning .................... 711/114 |
| 2002/0152416 A1 | * | 10/2002 | Fukuda ........................... 714/7 |

FOREIGN PATENT DOCUMENTS

| | | |
|---|---|---|
| JP | 01-250128 | 10/1985 |
| JP | 07-210336 | 8/1995 |

* cited by examiner

*Primary Examiner*—Scott Baderman
*Assistant Examiner*—Anne L. Damiano
(74) *Attorney, Agent, or Firm*—Townsend and Townsend and Crew LLP

(57) ABSTRACT

RAID information and physical position information of hard disk units are managed by a disk controller in a mapped fashion. When the physical position of the hard disk units is changed, the information mapping is retried. Further, the positional information of the hard disk units accommodated in a disk array system under the administration of the disk controller, is calculated so as to form n-dimensional coordinate system information, and the resulting information is stored in each of the hard disk units. When the hard disk units are inserted into the disk array system, the n-dimensional coordinate system information is read from each hard disk unit. If it is detected that there is difference from the current coordinate system information, then information before removal and that after the insertion are compared with each other and a data link is reconstructed.

9 Claims, 6 Drawing Sheets

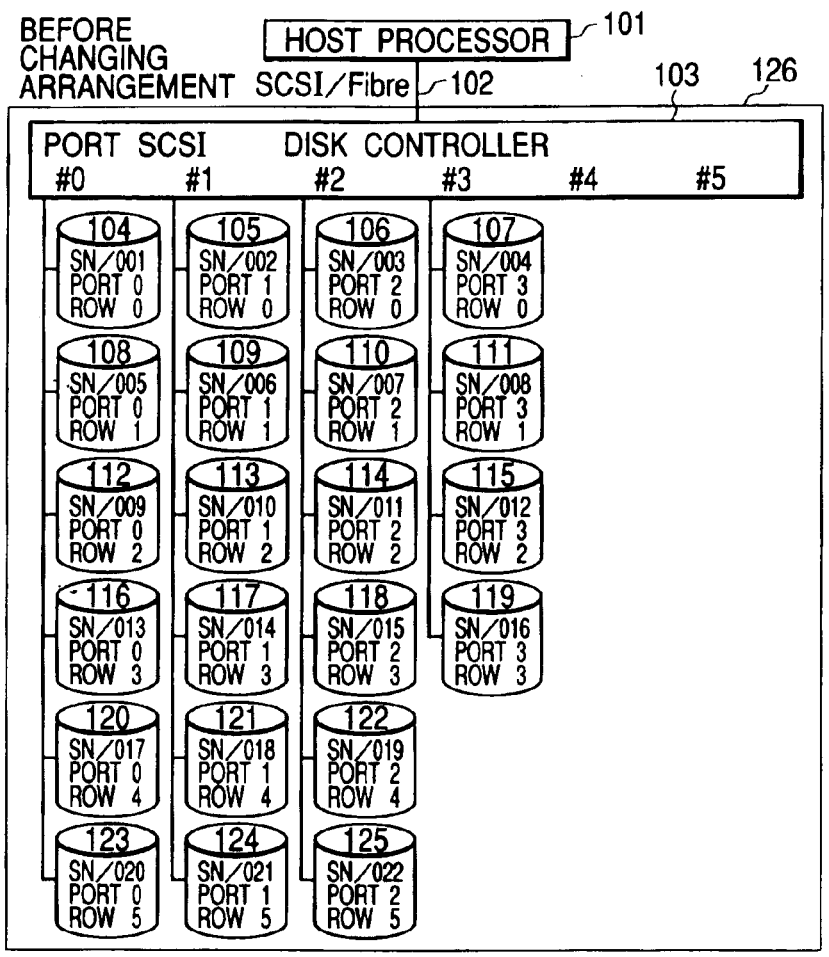
FIG. 1A BEFORE CHANGING ARRANGEMENT
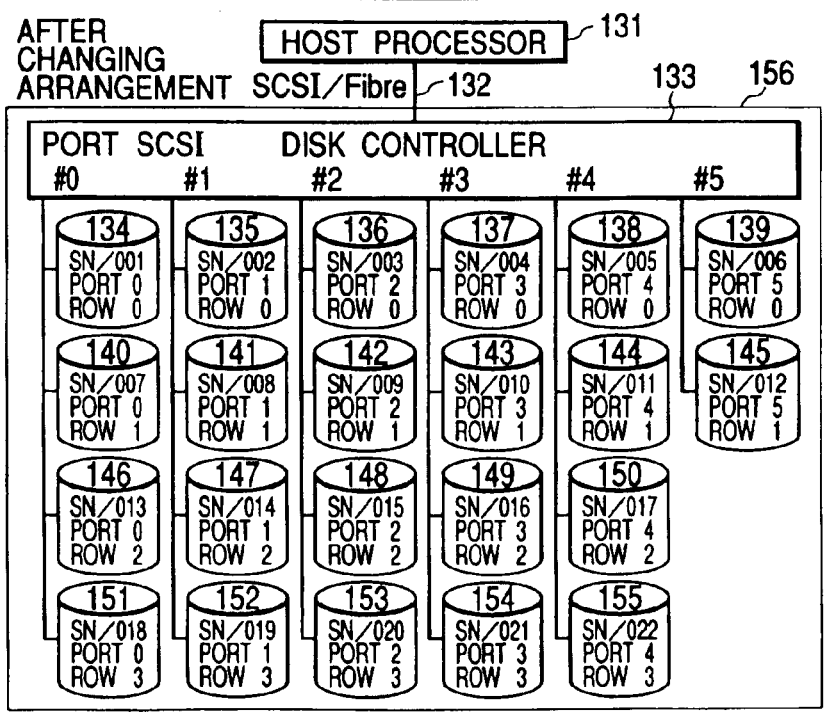
FIG. 1B AFTER CHANGING ARRANGEMENT

FIG. 2A
(1) BEFORE CHANGING ARRANGEMENT (PORT, ROW) SERIAL NUMBER

| (0,0) 001 | (1,0) 002 | (2,0) 003 | (3,0) 004 | (4,0) — | (5,0) — |
|---|---|---|---|---|---|
| (0,1) 005 | (1,1) 006 | (2,1) 007 | (3,1) 008 | (4,1) — | (5,1) — |
| (0,2) 009 | (1,2) 010 | (2,2) 011 | (3,2) 012 | (4,2) — | (5,2) — |
| (0,3) 013 | (1,3) 014 | (2,3) 015 | (3,3) 016 | (4,3) — | (5,3) — |
| (0,4) 017 | (1,4) 018 | (2,4) 019 | (3,4) — | (4,4) — | (5,4) — |
| (0,5) 020 | (1,5) 021 | (2,5) 022 | (3,5) — | (4,5) — | (5,5) — |

FIG. 2B
(2) AFTER CHANGING ARRANGEMENT

| (0,0) 001 | (1,0) 002 | (2,0) 003 | (3,0) 004 | (4,0) 005 | (5,0) 006 |
|---|---|---|---|---|---|
| (0,1) 007 | (1,1) 008 | (2,1) 009 | (3,1) 010 | (4,1) 011 | (5,1) 012 |
| (0,2) 013 | (1,2) 014 | (2,2) 015 | (3,2) 016 | (4,2) 017 | (5,2) 018 |
| (0,3) 019 | (1,3) 020 | (2,3) 021 | (3,3) 022 | (4,3) — | (5,3) — |
| (0,4) — | (1,4) — | (2,4) — | (3,4) — | (4,4) — | (5,4) — |
| (0,5) — | (1,5) — | (2,5) — | (3,5) — | (4,5) — | (5,5) — |

FIG. 4
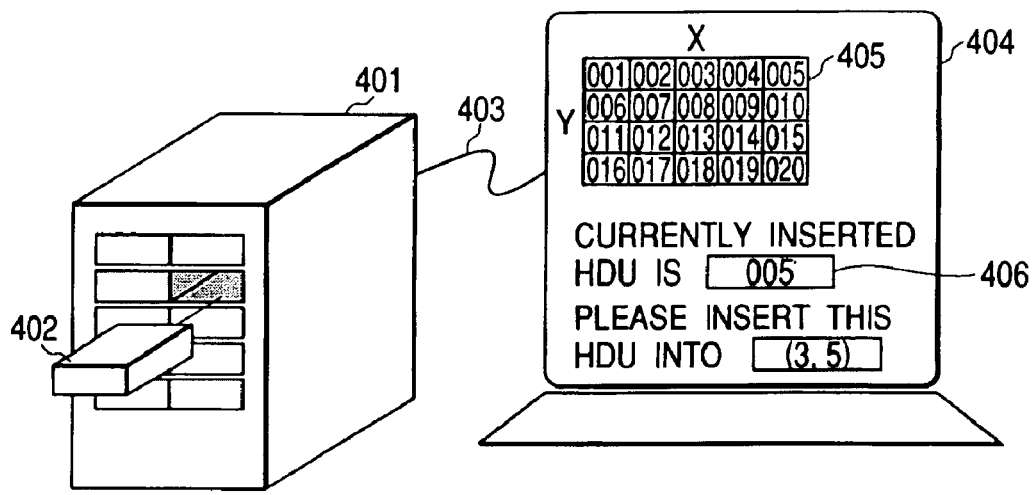
FIG. 5
| LU | DATA DRIVE S/N | | | PARITY DRIVE S/N |
|---|---|---|---|---|
| 1 | 001 | 002 | 003 | 004 |
| 2 | 005 | 006 | 007 | 008 |
| 3 | 009 | 010 | 010 | 012 |
FIG. 6
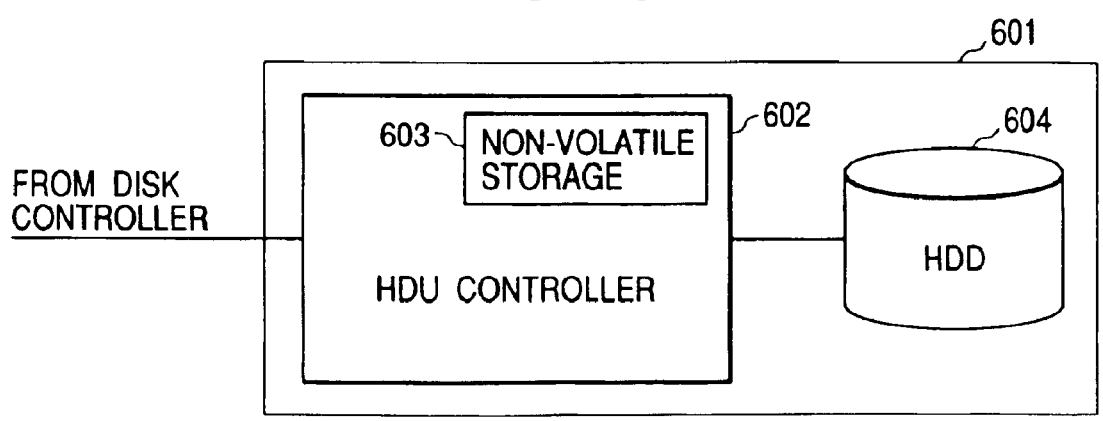

DISK ARRAY SYSTEM

BACKGROUND AND SUMMARY OF THE INVENTION

The present invention relates to a method of controlling hard disk units accommodated in a disk array system.

A disk array system is ordinarily arranged to accommodate a plurality of hard disk units. One of the features of the disk array system utilized so far is that when any trouble is caused in the hard disk units accommodated in the disk array systems, the target hard disk unit is removed from the system and a hard disk unit with no failure is accommodated in the place where the problematic hard disk unit suffering from a problem is housed, whereby it becomes possible to restore the data stored in the system. For example, Gazette of U.S. Pat. No. 4,870,643 discloses a matter relating to the data restoration upon exchanging a hard disk unit.

Further, according to the invention disclosed in Gazette of U.S. Pat. No. 4,870,643, it is assumed that, ordinarily, no more than one hard disk unit will become problematic at a time, so that it is unnecessary to manage on the disk control side information of each hard disk unit actually inserted. That is, if a hard disk unit is once removed at a position from the disk array system and then inserted into a position different from that position (e.g., the removed hard disk is inserted into a slot adjacent to the slot where the hard disk unit was inserted), it becomes impossible to take data coordination, with the result that information stored in the disk can be destroyed.

As described above, for example, if there are a plurality of ports under control of the controller and a plurality of hard disk units are connected to the ports, or alternatively, balance is taken between the number of ports to be utilized and the hard disk units coupled to the ports in order that the transfer efficiency is improved, in a conventional manner, data stored in the hard disk units shall be wholly reserved as backup data before rearranging the hard disk units, and thereafter the data is loaded in the system to build the disk array system.

Further, the above disk array system can encounter the following problem. That is, when the disk array system is moved from one place to another, for example, all of the hard disk units may be taken out from a housing of the disk array system and each of the disk array system components is transported separately so that the hard disk unit can be protected from vibration or the like upon transportation of the components. In this case, if the disk array system is large sized, the number of hard disk units may reach one hundred or more. Therefore, when the disk array system components are transported to the destination and the hard disk units are inserted into a housing of the disk array system to reconstruct the disk array system, it is not guaranteed that all of the hard disk units are inserted into their correct position of the housing. If a hard disk unit is inserted into the housing at an erroneous position, data can be destroyed in the worst case. Unlike the ordinary case where only one hard disk unit suffers from failure, it is unrealistic to try all of the combinations between the hard disk units and respective insertion slots of the disk array system housing.

According to one means of the present invention for solving the above-identified problem, RAID logic arrangement information and the hard disk unit physical position information are subjected to mapping and the resulting information is managed by a disk controller or a host controller thereof. According to the arrangement, even if the hard disk unit physical position is changed, information mapping is retried in accordance with the existing mapped information. Thus, data coordination can be guaranteed.

Further, according to another means of the present invention, information of the hard disk units accommodated in the disk array system under the administration of the disk controller is rearranged to indicate positions based on an n-dimensional coordinate system information, and the resulting information is stored in each of the hard disk units. When the hard disk unit is inserted, the n-dimensional coordinate system information is read from each of the hard disk units. If it is detected that there is difference between the current coordinate system information and coordinate system information read from each of the hard disk units, then information of the arrangement of the hard disk units before removal and that after the insertion are compared with each other and the data link is reconstructed. Thus, information can be restored.

Furthermore, according to still another means of the present invention, the disk array system writes an identification number in each of the hard disk units so that each hard disk unit has its inherent number, and an assignment table indicating assignment relation between the administration number and actual n-dimensional physical position coordinate is displayed. Therefore, a user can confirm a correct position at which the hard disk unit is to be inserted in accordance with the result of display. Alternatively, the user can be given a command message about the physical position according to which the hard disk unit insertion is changed. Thus, information can be restored.

According to the above technologies, even if the hard disk unit to be exchanged is changed in its position at which the hard disk unit is inserted, data can be guaranteed and the data need not undergo backup upon changing the arrangement of the hard disk units. Further, if many hard disk units are transported in a manner in which each hard disk unit is separated from the housing of the disk array system, data can be protected from damage due to an erroneous insertion position upon assembling the disk array system at the destination of transportation.

Moreover, according to the present invention, if the disk array system has an arrangement including one disk controller and two or more hard disk units under administration of the disk controller, and the hard disk units are removed from the disk array system and again inserted into the same, then the user can insert the hard disk units into the disk array system without any consciousness about the arrangement of the hard disk units before they are removed from the housing. Thus, data can be protected from damage due to incorrect position of insertion.

For example, when the housing into which the hard disk units are inserted is to be exchanged, the above-described mapping function can be utilized. If the housing is exchanged in this manner, the hard disk units can be accommodated in other housing without sheltering or installing the data.

When the disk array system is transported and the hard disk units are removed from the housing of the disk array system for the sake of security of the transport work, for example, the user can insert the hard disk units into the disk array system without any consciousness about the arrangement of the hard disk units before removal operation at the destination of the transportation. Therefore, improvement in working efficiency can be expected.

Furthermore, if the mapping information is displayed and the function for verifying the actual insertion position is effected, the user can positively confirm the position at which the hard disk unit was inserted. Therefore, trouble caused by moving the disk array system can also be prevented.

Though some merits or advantages deriving from the present invention have been listed above, at least some of them can be expected by implementing the present invention. Two or more merits or advantages can be expected depending on the specification of the disk array system of arrangement of the target disk array system. However, some of the merits or advantages may not become conspicuous in spite of the fact that the present invention is implemented. In this case, it is to be noted that, if there is no apparent merit or advantage on a disk array system, which fact does not decisively mean that the present invention is not applied to the disk array system.

BRIEF DESCRIPTION OF THE DRAWINGS

FIG. 1A is a diagram illustrative of an arrangement of hard disk units constituting a disk array system before changing the arrangement thereof;

FIG. 1B is a diagram illustrative of an arrangement of hard disk units constituting a disk array system after changing the arrangement thereof;

FIG. 2A is a diagram showing in a table form an example of mapped information of the hard disk units constituting the disk array system before changing the arrangement thereof;

FIG. 2B is a diagram showing in a table form an example of mapped information of the hard disk units constituting the disk array system after changing the arrangement thereof;

FIG. 4 is a diagram illustrative of a housing of the disk array system and a display unit connected to the housing according to the present invention in which the display unit displays an assisting message for a user who is trying to reassemble the disk array system;

FIG. 5 is a diagram showing in a table form an example of RAID arrangement logic information of the disk array system according to the present invention;

FIG. 6 is a diagram illustrative of a case where data is written into a hard disk unit of the disk array system according to the present invention;

DETAILED DESCRIPTION OF THE PREFERRED EMBODIMENTS

Figure 3:
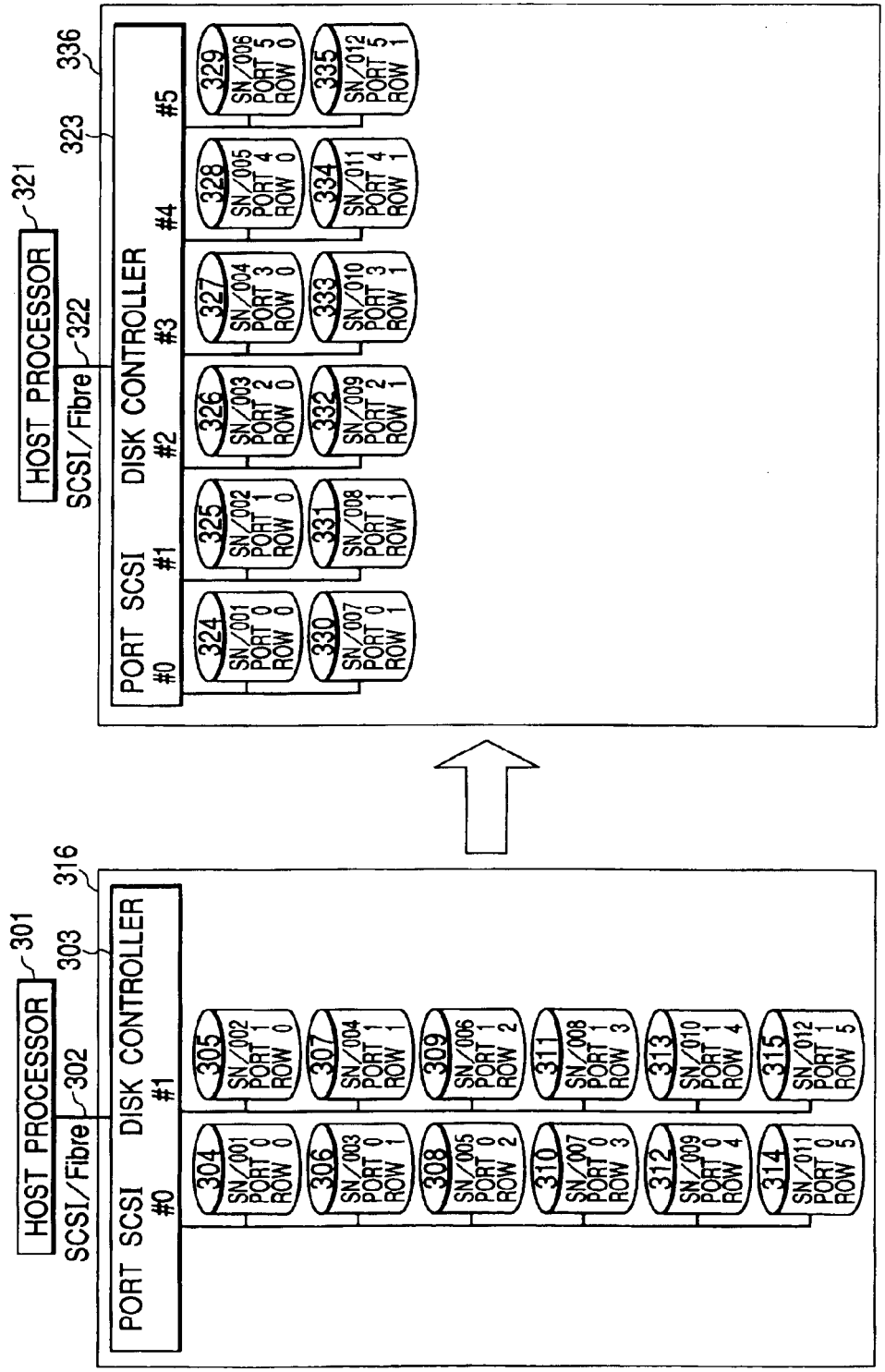
FIG. 3 is a diagram illustrative of a disk array arrangement in which hard disk units of the disk array system are removed and inserted into a housing of another disk array system.

Some embodiments of the disk array system according to the present invention will hereinafter be described in detail with reference to drawings.

FIGS. 1A and 1B are diagrams each illustrative of an arrangement of hard disk units constituting a disk array system to which the present invention is applied. FIG. 1A shows an arrangement before arrangement-changing is not executed and FIG. 1B shows an arrangement after the arrangement-changing is executed. According to the present invention, even if the arrangement-changing is executed as shown in FIGS. 1A and 1B, data stored in the disk array system can be preserved without using any sheltering means such as means for backup. The example will hereinafter be described in detail.

FIGS. 1A and 1B are also illustrative of how connection is established between a host processor 101 and a disk array system 126. The host processor 101 and the disk array system 126 are connected to each other by means of SCSI or a fiber channel 102 as an interface. A housing 126 of the disk array system has accommodated therein a disk controller 103 having ports #0 to #5. Each of the ports #0 to #5 is connectable to hard disk units 104 to 125, and these hard disk units constitute a RAID arrangement. In the example shown in FIG. 1A, the hard disk units are connected to the ports #0 to #3. The ports #4 to #5 are left unused. In the arrangement shown in FIG. 1A, the number of hard disk units connected to respective ports are unbalanced, i.e., a relatively large number of hard disk units are connected to the ports #0 to #3 while no hard disk unit is connected to the ports #4 to #5. Such arrangement will not provide good access efficiency, and hence there is a tendency that so called unstable state is brought about.

Therefore, it is reasonable to change the hard disk unit connection arrangement from one shown in FIG. 1A to that shown in FIG. 1B. According to the arrangement shown in FIG. 1B, all ports from #0 to #5 of the disk controller 156 are connected with hard disk units.

According to the above arrangement, the number of hard disk units 134 to 155 connected to one port becomes small, with the result that the disk array system is operated with stability. If the arrangement of the hard disk units is changed in a conventional manner, there is no way but the data of the disk array system are wholly sheltered, and thereafter the arrangement is changed and the sheltered data are loaded. According to the conventional method, a large amount of recording media are required for sheltering the data and further it takes a long time and labor to shelter the data and restore the disk array system. For example, Japanese Patent Laid-open No. Hei 7-210336 discloses one example of a conventional method. The present invention which will be described below is made to solve the above-identified problem.

FIGS. 2A and 2B are diagrams each showing in a table form an example of mapped information of the hard disk units constituting the disk array system. The disk controller 156 is made to have stored therein the information indicative of the relative relation among the port number, the row number, a hard disk unit identification number inherent in the unit, as shown in FIGS. 2A and 2B.

Then, actual RAID logic arrangement is mapped in such a manner that, for example, one RAID arrangement (Logical Unit (LU)) is formed of (0,0) (1,0) (2,0) and each piece of information is coupled to a piece of data, 001, 002, 003 designating the respective hard disk units.

In the arrangement of FIGS. 1A and 1B, a group of hard disk units (0,1) (1,1) (2,1) constitute other logical unit. Similarly, (112 to 4), (116 to 8), (120 to 2), (123 to 5) constitute another logical units. Hard disk units designated by (107), (111), (115), (119) are made to serve as preparatory hard disk units.

If a manner for using the ports is changed and the above-described RAID arrangement is changed to that shown in FIG. 1B, then operation will be carried out as follows.

According to the present invention, when the hard disk unit is inserted, the disk controller compares the relative information associated with the mapping information with the identification information of the hard disk unit. For example, a hard disk unit (104) is inserted into a slot denoted as (134). If this insertion is verified in accordance with the mapping information, the identification number of the hard disk unit before changing the arrangement and that after changing the arrangement agree with each other. Therefore, the mapping information is not changed. Such verification is executed in the similar manner each time the hard disk unit is inserted into the housing of the disk array system. For example, if the hard disk unit (108) is inserted into a slot denoted as (138), then it is confirmed that the inserted hard disk unit has a number of 005 in accordance with the identification number of the hard disk unit, and the hard disk unit identified by 005 is located at the top of the second logic unit in accordance with the mapping information and this hard disk unit was accommodated in a slot of (0, 1).

At this time, the mapping information is partly changed. For example, the second logical unit is formed of the hard disk units of an order of (0,1), (1, 1), (2, 1). This information is changed into that the second logical unit is formed of the hard disk units of an order of (4,0), (1, 1), (2, 1). When the hard disk unit is accessed for reading or writing data, a command is issued so as to designate a logical unit into/from which data is inputted or outputted. Therefore, since the arrangement of the logical units is corrected in accordance with the mapping, the same data will be inputted/outputted in a manner similar to that before the arrangement is changed. Since the administration is effected on the mapped information, a worker will assemble the hard disk units without consciousness about the insertion positions at which the hard disk units were inserted. Therefore, it becomes possible to solve the aforesaid problem that the conventional technology encounters when the arrangement of the hard disk units is changed, and hence arrangement-change can be effected without taking backup of the hard disk units so long as the administration as described above is carried out.

The mapping information described above is managed on a non-volatile storage of the disk controller, for example. If the disk controller is a duplex-type, the management of information is naturally effected in a duplex manner. The way for mapping the information described above is merely one example, and hence many mapping schemes can be applicable for optimizing the mapping performance upon actual use. The present invention is characterized by a disk array system in which this mapping scheme can be implemented. Therefore, the present invention is also characterized by the function which makes the worker or the like allowable to do disk insertion operation without consciousness about the insertion positions at which the hard disk units were inserted.

Other example will be described with reference to FIG. 3. If it is desired to exchange a housing of the disk array system with other housing having a larger number of hard disk unit slots so that the disk array system becomes allowable to accommodate more hard disk unit as an extension, the following operation is requested if a conventional manner is employed. That is, a backup of data is prepared and thereafter the data is restored in the new housing. Even in this case, if the mapping information described with reference to FIGS. 1A, 1B, 2A and 2B is transferred to the disk controller of the housing as the target of transfer, then the hard disk units can be inserted into the hard disk unit slots of the housing as the target of transfer without consciousness about the insertion positions at which the hard disk units were inserted. Further, data contents can be guaranteed. If the present invention is applied, the mapping information is installed into the disk array system as the target of transfer prior to the removal and insertion of the hard disk units. Therefore, the disk array system can restore the disk information which was installed before the removal and insertion of the hard disk units. Further, it will be easy for an engineer skilled in the art to add or delete a piece of mapping information at the logic unit. If the scheme of transferring of piece of information is utilized, the worker can move the hard disk units without consciousness about the insertion positions at which the hard disk units were inserted even if the hard disk arrangement is modified at the logical unit before and after the removal and insertion of the hard disk units.

Other example will be described. According to the example, the disk array system is made to recognize the identification information of the hard disk unit. That is, when a hard disk unit is inserted into the housing of the disk array system, or alternatively, the information corresponding to the hard disk unit is not found in the mapping information, the disk array system writes a recognition number unique to the administration information, for example, of the inserted hard disk unit. In order to make the hard disk unit be identified even if the hard disk unit is transported all over the world, the numbering scheme of the recognition number may be arranged based on a global standard. If the disk array system reads the identification information of the hard disk unit, it becomes possible for the disk array system to realize the above described mapping with ease. Further, if the disk array system reads the identification information of the hard disk unit and displays the result of the reading on a display function unit which is provided on the disk array system, for example, a user can recognize the identification number of the hard disk unit with his/her vision.

Further, if the disk array system is additionally provided with a function for displaying the mapping information, for example in a case where the hard disk units are to be inserted into the housing of the disk array system at the transportation destination, the mapping information can be displayed prior to the insertion work. If a worker temporarily inserts the hard disk unit without any intention, the worker can recognize the identification number of the inserted hard disk unit. Thus, the worker can retry correct insertion work in accordance with the mapping information. The term "mapping information" is such a table illustrated in FIG. 2, for example. A lot of products of the disk array system recently available from the market employ Web-assisted display function. Thus, Web may be employed in the disk array system according to the present invention.

An engineer skilled in the art will make an application such that, for example, the mapping information and information of the inserted hard disk unit are displayed on a Web-screen, and insertion position changing instruction is provided by means of speech guide or the like, for example. Such application may be anticipated and implemented with ease. Further, such kind of technology can be implemented based on the present invention.

FIG. 4 is a diagram illustrative of one example of insertion work by using the Web-screen. Initially, a hard disk unit 402 is inserted into a disk array system, for example. The disk array system 401 and a personal computer 404 are connected to each other through a network line 403. Therefore, contents of the mapping information of the disk array system can be confirmed by the Web-screen of the personal computer 404 by way of the network.

A mapping display screen 405 is implemented as shown in FIG. 4, and the identification number of the inserted hard disk unit is displayed (406) below the mapping display screen 405. Further, the correct insertion position for the hard disk unit is displayed and a speech guiding message is also generated. By using this function, even if the number of the hard disk units is increased up to one hundred or more, the original data status of the disk array system can be positively restored with ease.

Other example will be described with reference to FIG. 5. For example, when an initial setting operation of an RAID apparatus is completed, RAID arrangement logic information is written into a hard disk unit. As for example shown in FIG. 5, the RAID arrangement logic information is indicative of a logical unit 1 which includes a data drive composed of drive serial numbers of 001, 002, 003 and a parity drive composed of a drive serial number of 004. The following logical units 2 and 3 also include similar information and this information constitutes the RAID arrangement logic information. A spare disk is also subjected to the administration of the disk array system so that a serial number can indicate that the hard disk unit serves as a spare disk. The disk array system writes only a corresponding part of the RAID arrangement logic information to each of the hard disk units.

For example, a hard disk unit having a serial number of 001 is made to have written information indicating that the serial number of its own hard disk unit is 001 and it constitutes a first unit of the logic unit. The data format thereof may be, for example, (001, LU1, 1). If the serial number of the hard disk is 004, then the data format becomes (004, LU1, P). In this way, every hard disk unit is made to have information indicative of its own role written therein.

When the disk array system is requested to be transported, for example, the hard disk units inserted into the housing of the disk array system are once removed from the housing thereof, and then these hard disk units are again inserted into the housing of the disk array system at the destination of transportation. At this time, all of the hard disk units are once inserted into the housing of the disk array system. When the hard disk units are inserted into the housing, the worker is allowed to insert the hard disk units without consciousness about which slot the hard disk unit was inserted into in the status before transportation. When all of the hard disk units are inserted into the housing, then the program for reconstructing the disk arrangement may be executed. This program can be executed in such a manner that a piece of RAID arrangement logic information is read from each of the inserted hard disk units, when piece of RAID arrangement logic information is read from all hard disk units, RAID arrangement logic information as a whole and relative position relation information indicative of relationship with actually inserted positions are created, and then the created information is transferred to the disk controller. Thus, the disk controller can restore the data in the status before transportation. In this case it can be assumed that, when the data reconstruction is executed, a situation can be brought about that one hard disk unit is missing, for example. In order to cope with such a case, the reconstruction program may be arranged so that an alarm message is generated and the disk array system is brought to a mode for awaiting the insertion of the hard disk unit. Alternatively, the disk array system generates a message requesting that a spare hard disk unit is allocated.

If any of the hard disk units suffers from failure or the like, the disk array system can cope with such problem by effecting the above-described processing. The means for displaying the message may not be limited to the Web-screen on the personal computer connected to the housing of the disk array system, for example. Although in the above example description has been made on a case in which data writing into the hard disk unit is effected upon initial settlement, for example, the data writing may be effected independently when a hard disk unit suffering from failure is found and the hard disk unit is replaced with a spare one. Also, when the transportation work is started, the writing processing may be again effected so that the status of the data in the disk array system is updated to bring the status of the data into the latest version. By using the above-described function, the maintenance engineer can be made allowable to do transportation work without consciousness about the insertion position of the hard disk unit before transportation, with the result that data can be protected from disruption due to an erroneous working step.

An example of data writing into the hard disk unit will hereinafter be described with reference to FIG. 6. As shown in FIG. 6, an ordinary hard disk unit 601 is composed of a hard disk unit controller 602 and a hard disk drive 604. The hard disk unit controller 602 is ordinarily arranged to include a non-volatile storage 603, and a firmware or the like is stored in the storage. The non-volatile storage 603 is made to have information necessary for forming the above-described RAID arrangement stored therein, whereby the disk array system can be operated in a mode in which the present invention is applied. Since the storage has a non-volatile property, even if the hard disk unit is removed from the disk array system and again accommodated in the system through transportation, the information stored therein will not be lost. Thus, no problem will arise due to the removal of the hard disk unit. Further, if the disk array system is utilized as an initial stage, the hard disk units may undergo initial processing.

There can be other method of writing data into the hard disk units. That is, information may be directly written into administration record of the hard disk drive. One hard disk unit is ordinarily arranged to include a plurality of disks. Therefore, for example, a scheme may be employed such that a starting portion of a recording area of several bytes of the first disk may be allocated for storing the administration record. It is easy for the hard disk unit controller to control the management, writing and reading of the administration record. Further, a host disk controller may control the above operation.

Figure 7:
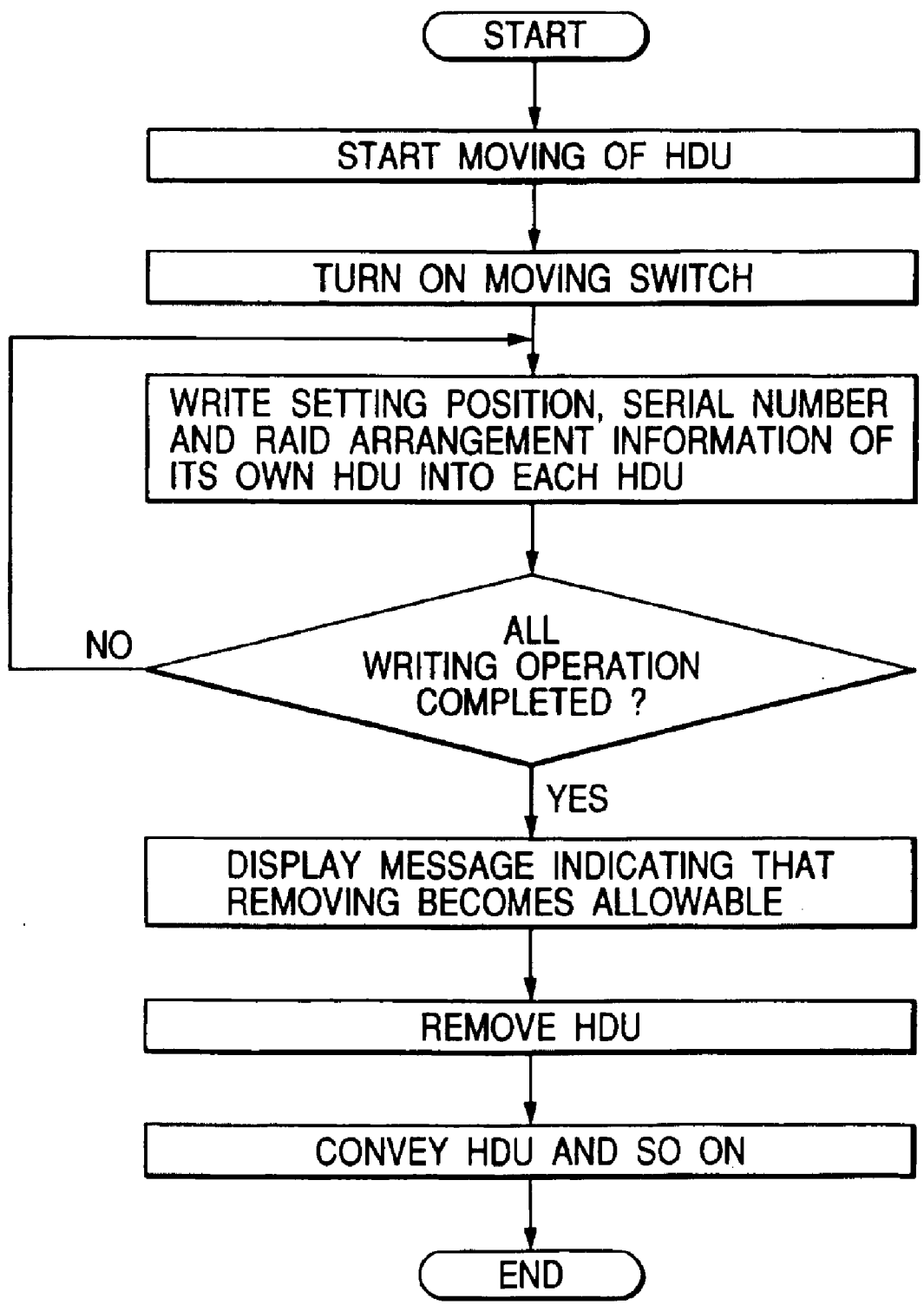
FIG. 7 is a flowchart for explaining an operation when the hard disk units are removed from the housing of the disk array system upon transportation.

A process to which present invention is applied executed when a housing of the disk array system having a RAID arrangement installed therein is transported with all hard disk units inserted into the housing removed will be described with reference to flowchart of FIG. 7.

Initially, a transportation switch of the housing is depressed. Then, the disk controller writes into each of all hard disk units, information indicative of the insertion position, a serial number, and other information for forming RAID arrangement (e.g., location of own disk unit in the logical unit and number of disk unit and so on). Whole information written into the hard disk units are stored in the disk controller as mapping information. When writing processing is completed, a display unit of the disk array system displays a message indicating that the writing processing is completed. After the message is displayed, a worker starts removing operation of the hard disk units.

Figure 8:
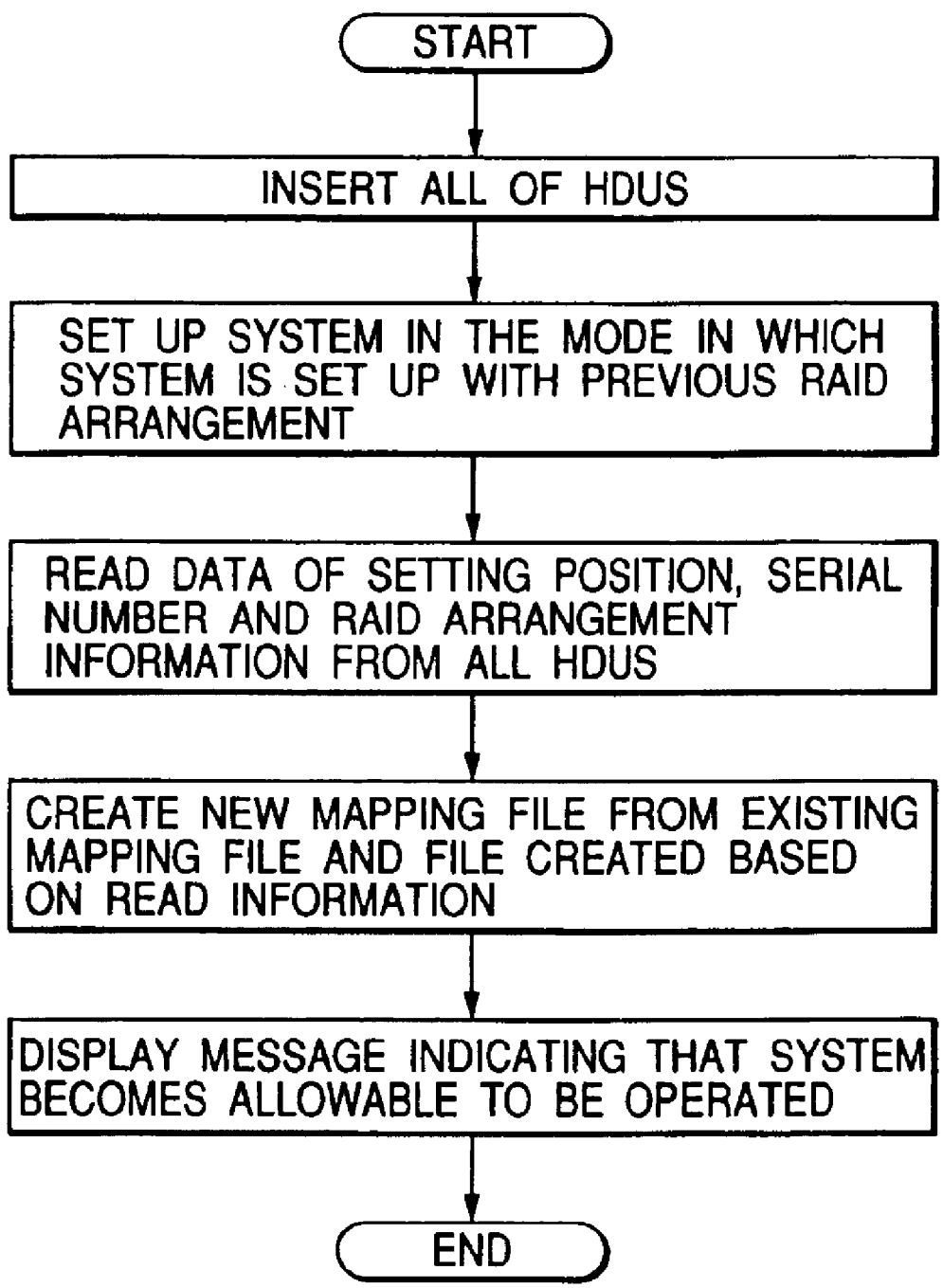
FIG. 8 is a flowchart for explaining an operation when the hard disk units are inserted into the housing of the disk array system after transportation.

A reassembling work carried out at the transportation destination will be described with reference to FIG. 8. Initially, all hard disk units are inserted into the housing of the disk array system. A switch is depressed so that the RAID arrangement is restored in a mode before transportation. In response to the depressing operation of the switch, the disk controller reads information written in the hard disks indicative of the inserted position, the serial number and other information for forming the RAID arrangement from each of the hard disk units. Mapping information created from the information and mapping information in a mode before transportation stored in the disk controller are compared with each other. Information indicative of the inserted position is revised based on the comparing operation and mapping is retried. Thus, the RAID arrangement before transportation can be restored. If the mapping information is completely recovered, the disk array system informs the worker that the system is brought into an ordinary operation mode. In this way, actual work is carried out.

If the hard disk units removed from the housing are inserted into a different housing after transportation, the mapping file stored in the disk controller before transportation is installed into the disk controller of the housing after transportation before the hard disk units are inserted. It will be easy to add data file in an extension mode if more hard disk is to be inserted after transportation.

While in the above-described several examples description has been made on a case in which the hard disk units are internally connected to one another in the disk array by using SCSI connection, the present invention can be applied to a case in which a fiber channel connection or other type of connection is employed.

The present invention is not limited to the above-described several example but various modifications can be implemented without departing from the gist of the present invention.

What is claimed is:

1. A disk array system comprising:

a disk controller;

a housing; and at least two hard disk units accommodated in the housing and controlled by the disk controller, wherein the disk controller includes a first memory which stores RAID arrangement logic information, the at least two hard disk units each have a second memory which stores an identifier to identify the hard disk unit and excludes RAID arrangement logic information corresponding to other hard disk units, and if a hard disk unit of the at least two hard dish units is inserted into a slot of the housing, the disk controller detects the slot, reads the identifier stored in the hard disk unit inserted into the slot, and forms mapping information based on the RAID arrangement logic information and the identifier stored in the hard disk unit inserted into the slot.

2. A disk array system comprising:

a disk controller;

a housing; and at least two hard disk units accommodated in the housing and controlled by the disk controller, wherein the disk controller includes a memory which stores RAID arrangement logic information, and the disk array system has a mapping function for forming mapping information of RAID arrangement logic information and a hard disk unit physical position information, the at least two hard disk units each exclude RAID arrangement logic information corresponding to other hard disk units, and if a hard disk unit of the at least two hard disk units is inserted into the housing, the disk controller determines the hard disk unit physical position information, reads an identifier stored in the hard disk unit to identify the hard disk unit, and forms mapping information.

3. A disk array system comprising:

a housing;

a plurality of hard disk units disposed in the housing; and a disk controller including a controller memory which stores RAID arrangement logic information of the plurality of hard disk units;

wherein each of the hard disk units includes a part of the RAID arrangement logic information corresponding to the individual hard disk unit and excludes RAID arrangement logic information corresponding to other hard disk units; and if a hard disk unit of the plurality of hard disk units is inserted into a slot of the housing, the disk controller detects the slot, reads the part of the RAID arrangement logic stored in the hard disk unit, and forms mapping information based on the RAID arrangement logic information and the part of the RAID arrangement logic stored in the hard disk unit.

4. The disk array system of claim 3 wherein the part of the RAID arrangement logic information each comprises an identification number and setting position information of the individual hard disk unit.

5. The disk array system of claim 3 wherein each hard disk unit includes a memory configured to store a corresponding part of the RAID arrangement logic information.

6. The disk array system of claim 3 wherein the disk controller is configured to write the part of the RAID arrangement logic inform lion into each of the bard disk units.

7. The disk array system of claim 3 wherein the disk controller is configured to read the part of the RAID arrangement logic information from each of the hard disk units.

8. The disk array system of claim 3 wherein the disk controller is configured to compare the RAID arrangement logic information stored in the controller memory with the parts of the RAID arrangement logic information of the hard disk units and to update mapping information if necessary.

9. The disk array system of claim 3 wherein the disk controller is configured to form the mapping information the RAID arrangement logic information.

* * * * *